J. WHITEHEAD.
Rotary Cultivator.

No. 17,467.

Patented June 2, 1857.

UNITED STATES PATENT OFFICE.

JESSE WHITEHEAD, OF MANCHESTER, VIRGINIA.

IMPROVEMENT IN MACHINES FOR DRESSING WATER-FURROWS IN LAND.

Specification forming part of Letters Patent No. 17,467, dated June 2, 1857.

*To all whom it may concern:*

Be it known that I, JESSE WHITEHEAD, of Manchester, in the county of Chesterfield and State of Virginia, have invented a new and useful Machine for Dressing or Shaping the Water-Furrows in Land; and I do hereby declare that the following is a full and exact description of the same, reference being had to the accompanying drawings, making a part of this specification, in which—

Figure 1:
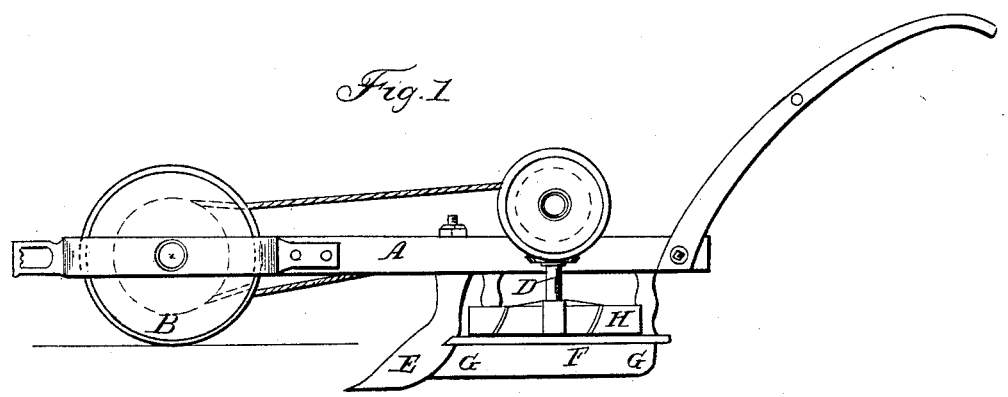
Figure 2:
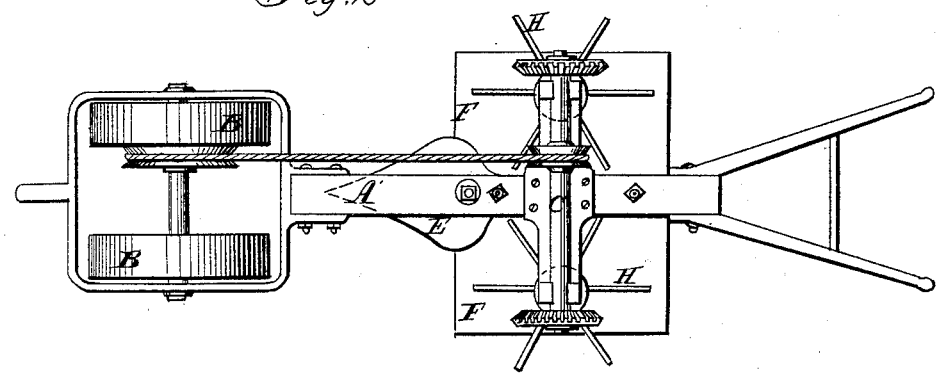

Figure 1 is a longitudinal elevation, and Fig. 2 a plan of the same.

The same letters of reference denote the same parts in both figures.

The nature of my invention relates to a machine for dressing or shaping water-furrows which have been previously turned, and scattering the earth removed therefrom, so as to admit of the easy drainage of the water into it, the previously-turned furrow serving as a guide or directrix to the machine as it moves along.

To enable others skilled in the art to make and use my invention, I will proceed to describe the same with reference to the drawings.

A is a beam similar to an ordinary plow-beam. To the forward end of this beam is attached a pair of driving wheels or rollers, B, which are set some distance apart, in order that they may run on each side of the furrow and not compress the earth which the colter or plow will have to remove. These rollers give motion by means of the chain and pulleys, as shown in the drawings, to the horizontal cross-shaft C, which has two bevel-wheels on it, one at each end, gearing into the bevel-pinions on the top of the upright shafts D. At the bottom of these upright shafts, and working as close to the scraping plate or table F as is convenient, are the distributing blades or fans H for removing and scattering the earth taken out of the furrow by the colter or plow E. The roller B and the face of the scraping-table are intended to rest on the ground.

Underneath the scraping-table are two mold-boards, G G, one on each side of the colter, and they are made so as to round off the edge of the furrow, and at the same time to compress it hard, as the scraping-table will prevent the earth from rising.

The operation of the machine is as follows: The machine being drawn forward, motion is communicated to the fans or distributers H by means of the mechanism heretofore described, and the earth which the colter or plow lifts up from the furrow is scraped up on the table F, when it is scattered over the adjoining land by the revolving distributers H, while the face of the table F and the mold-boards G G will smooth off the edge of the furrow and compress it, so as to prevent the earth from tumbling into and filling up the furrow.

Having thus fully described my invention, what I claim as new, and desire to secure by Letters Patent of the United States, is—

In combination with the colter E and mold-boards G, which scrape off and smooth the sides of the furrow, and serve to guide and direct the machine along said furrow, the horizontal plate F, which shaves off the top of the furrow and receives all the excess of earth, and the distributers H for scattering the earth therefrom, so as not to leave it in ridges, the whole being combined and operating together, substantially in the manner and for the purpose set forth.

JESSE WHITEHEAD.

Witnesses:
CORNALL BRADLEY,
JAMES H. McGEE.